318-135
4/13/76    XR    3,950,661    SR

United States Patent [19]
Langmuir

[11] 3,950,661
[45] Apr. 13, 1976

[54] LINEAR INDUCTION MOTOR WITH ARTIFICIAL TRANSMISSION LINE

[75] Inventor: Robert V. Langmuir, Altadena, Calif.

[73] Assignee: Occidental Petroleum Corporation, Los Angeles, Calif.

[22] Filed: June 19, 1974

[21] Appl. No.: 480,713

[52] U.S. Cl. .................... 310/12; 318/135; 209/227
[51] Int. Cl.² ......................................... H02K 41/02
[58] Field of Search .......... 310/12, 13, 14; 318/135, 318/121; 209/227

[56] References Cited
UNITED STATES PATENTS

| | | | |
|---|---|---|---|
| 3,333,124 | 7/1967 | Francis et al. .................. | 310/12 UX |
| 3,478,234 | 11/1969 | Prem et al. ........................ | 310/12 X |

Primary Examiner—R. N. Envall, Jr.
Attorney, Agent, or Firm—Harris, Kern, Wallen & Tinsley

[57] ABSTRACT

A system for separating electrical conducting components from trash, particularly aluminum, copper and stainless steel materials since magnetic materials are readily removed by simple magnets. A linear induction motor connected as an artificial transmission line for operation from a single phase supply to provide a travelling wave along the motor for moving electrical conducting components. A conveyor system for moving the trash across the motor along a path perpendicular or oblique to the axis of the motor, with the motor functioning to move the electrical conducting components.

8 Claims, 6 Drawing Figures

LINEAR INDUCTION MOTOR WITH ARTIFICIAL TRANSMISSION LINE

This invention relates to linear induction motors and in particular, to a new and improved single phase linear motor which is particularly suited for use in trash separation.

A prior art trash separator utilizes a three phase linear induction motor which produces a travelling wave along the axis of the motor, with the resulting magnetic field being usable for induction motor applications. In the trash separator, the trash is moved across the pole faces of the motor along a path generally perpendicular to the axis of the linear motor and the electrical conducting components of the trash, such as aluminum and copper components, are moved by the motor action away from the trash conveyor.

The prior art device has a number of disadvantages. A three phase power supply is required. When used in the trash separator application, the linear induction has a very poor power factor. The power factor can be improved by adding a capacitor in series or in parallel with each phase of the motor, but this makes the system very frequency sensitive and easily detuned by adjacent conductors.

It is an object of the present invention to provide a new and improved linear induction motor which does not suffer from the disadvantages of the prior art motors. A further object is to provide a linear motor which is operated from a single phase supply and provides a travelling wave along the motor. It is a particular object of the invention to provide a linear induction motor in the form of an artificial transmission line which can provide a substantially resistive load for the power supply.

Other objects, advantages, features and results will more fully appear in the course of the following description. The drawing merely shows and the description merely describes a preferred embodiment of the present invention which is given by way of illustration or example.

IN THE DRAWING

Figure 1:
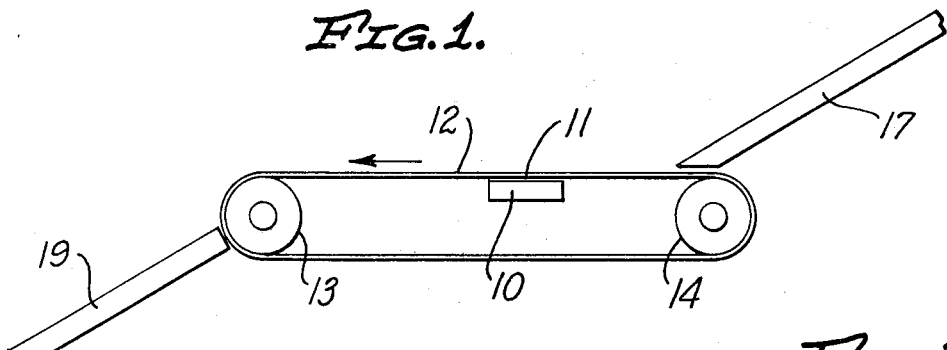
FIG. 1 is a side view of a trash separation system incorporating the presently preferred embodiment of the invention.
Figure 2:
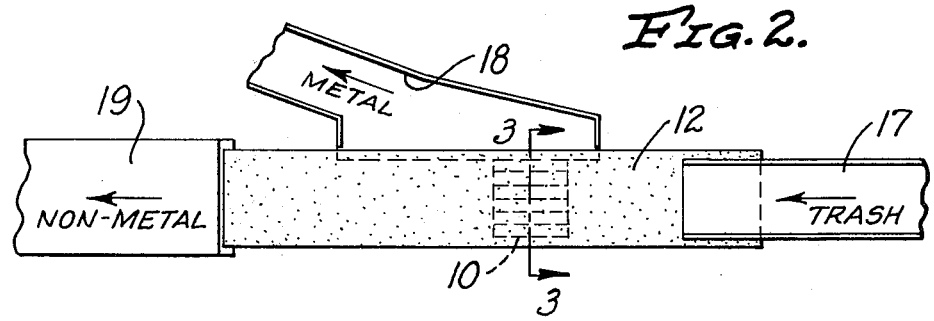
FIG. 2 is a top view of the system of FIG. 1.

The trash separation system of FIGS. 1 and 2 includes a linear motor 10 and means for moving the trash across the pole faces 11 of the motor. Typically a conveyor, such as an endless belt 12 driven on rolls 13, 14 provide the means for moving the trash. The trash may be delivered to the belt 12 upstream of the motor 10 by a chute or conveyor 17. The motor 10 functions to move the electrical conducting components in the trash to the side of the belt 12 into another chute or conveyor 18. The trash not moved by the motor is deposited into another chute or conveyor 19 by the belt 12. Ordinarily, the magnetic materials will be separated from the trash in the conventional manner by simple magnets upstream of the linear motor separation system. The linear motor functions to remove materials such as aluminum, copper, stainless steel and the like.

Figure 3:
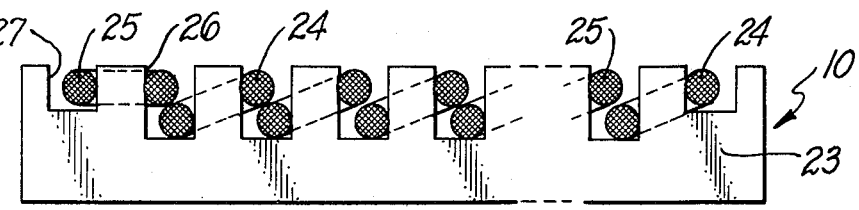
FIG. 3 is an enlarged sectional view of the linear motor taken along the line 3—3 of FIG. 2.
Figure 4:
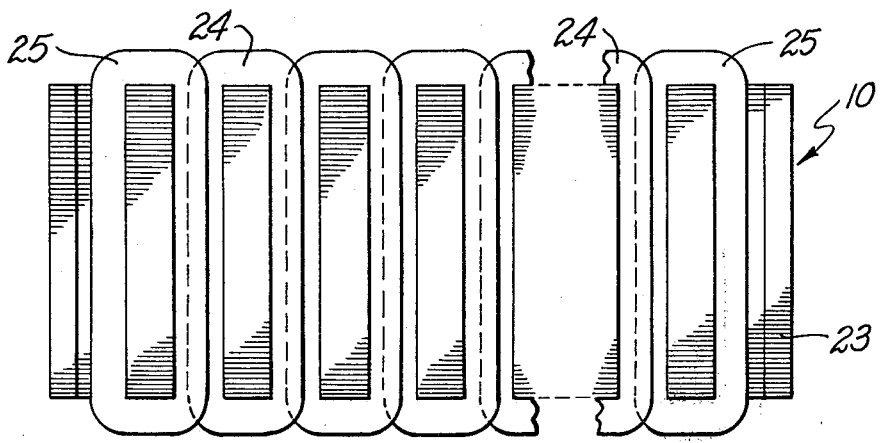
FIG. 4 is a top view of the motor of FIG. 3.

The linear motor as shown in FIGS. 3 and 4 may be conventional in construction. A core 23 is formed of a plurality of laminations of magnetic material held together by bonding or riveting or the like. A winding in the form of a plurality of coils 24, 25 is positioned in the slots 26, 27 of the core. As in the conventional linear motor, it is preferred to have the end poles of the core one half the width of the intermediate poles and to have the end coils 25 one half the inductance of the intermediate coils 24. The size of the core, the number of poles and the coil turns and wire size may be varied as desired, depending upon the particular intended use. In the embodiment illustrated, a coil is placed in adjacent slots, but the two sides of a coil may be positioned in spaced slots if desired. One specific embodiment utilized an eight pole core approximately 21 inches long with a 6 inch stack width formed of 0.018 inch M-36 steel. The coils were 150 turns of HML No. 20 magnet wire.

The coils are connected in series with a termination resistance 30 across a single phase ac supply, typically a 400 hertz power supply 31. Capacitors 32 are connected between the junctions of adjacent coils and the return line 33 to form an artificial transmission line. In the preferred embodiment illustrated, the artificial transmission line has an inductance of L Henries in series per unit length and a capacitance C farads to ground per unit length with a termination resistance R. When operated from a single phase ac supply, this motor provides a travelling wave having a phase velocity of $1/(LC)^{1/2}$. This phase velocity will be uniform along the length of the motor. However, if different phase velocities at different points along the motor are desired, this may readily be obtained by changing the value of capacitance and/or the inductance.

Figure 5:
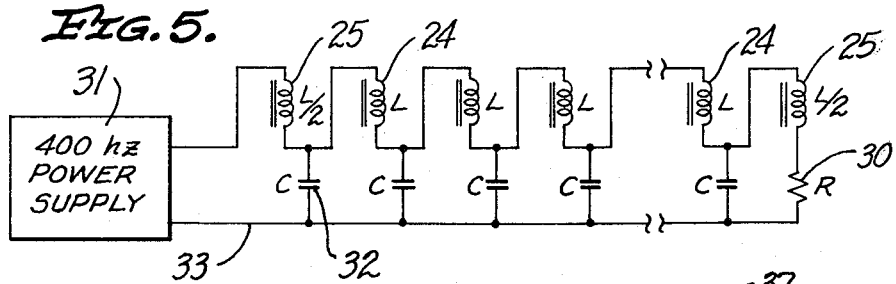
FIG. 5 is an electrical diagram of the motor of FIG. 3.
Figure 6:
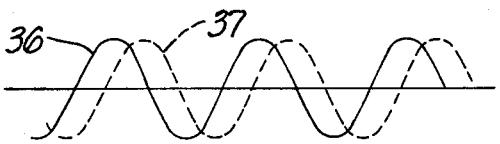
FIG. 6 is a diagram illustrating the travelling wave produced by the motor of FIG. 3.

At one instant in time, the linear induction motor of FIGS. 3–5 will produce a magnetic field as shown at 36 in FIG. 6. At a later instant in time, the magnetic field will be as shown at 37, resulting in a travelling magnetic wave moving to the right as viewed in FIGS. 3–6 and moving to the top as viewed in FIG. 2. This travelling magnetic wave interacts with the electrical conducting components being moved across the pole face by the belt 12 and produces a force moving the conducting components off the belt into the chute 18. There is no theoretical limit on the number of poles of an induction motor and artificial transmission line; however as a practical matter, the attenuation in the line indicates that for most applications a motor with not more than eight or 10 poles would be desirable.

The linear induction motor of the invention functions as an artificial transmission line and provides a substantially resistive load to the ac source. It has been found that the input impedance of the line will remain substantially constant when the line is operated below a predetermined frequency.

The relation of the inductance L and capacitance C and the frequency f of the power source should be such that $w/w_o$ is less than 2, and preferably about 1.5, where $w = 2\pi f$ and $w_o = 1/(LC)^{1/2}$. The value of resistance R may be chosen so that there is no wave reflected from the end at the artificial transmission line.

What is claimed is:

1. In a single phase linear induction motor, the combination of:

a magnetic core having a plurality of slots;

a plurality of coils positioned in said slots defining a plurality of magnetic poles in a line;

a termination resistance having first and second terminals;

circuit means for connecting said coils and termination resistance in series across a single phase ac power source, with said coils interconnected at junctions and with one coil connected to said termination resistance at said first terminal; and a plurality of capacitors, with a capacitor connected between each coil junction and said second terminal to form an artificial transmission line between said source and said termination resistance.

2. A motor as defined in claim 1 wherein the first and last coils in the series have substantially the same inductance which is substantially one half that of each of the remaining coils.

3. A motor as defined in claim 2 wherein each of said capacitors has substantially the same capacitance.

4. A motor as defined in claim 1 wherein different ones of said capacitors and/or said coils have different values of impedance providing different phase velocities of the travelling wave along said core.

5. A motor as defined in claim 2 wherein the capacitance C of said capacitors and the inductance L of the intermediate coils of the series are selected such that the ratio $w/w_o$ is less than 2, where $w=2\pi$ times the frequency of the ac source and $w_o = 1/(LC)^{1/2}$.

6. A motor as defined in claim 5 wherein C and L are selected such that $w/w_o$ is about 1.5.

7. A motor as defined in claim 1 including a single phase power source with said series coils and termination connected thereto.

8. A linear induction motor for operation from a single phase ac power source to produce a travelling electromagnetic wave along the motor, comprising:

a linear magnetic core with a plurality of coils thereon connected in series providing one side of a transmission line;

a conductor providing the other side of the transmission line;

a termination resistance connected at one end of said transmission line;

means for connecting a single phase ac power source at the other end of said transmission line; and a plurality of capacitors connected along said transmission line between said one side and said other side.

* * * * *